April 4, 1939.  E. A. ROCKWELL  2,153,509
POWER TRANSMITTING APPARATUS AND CONTROL THEREFOR
Filed Feb. 1, 1934  8 Sheets—Sheet 1

INVENTOR
Edward A. Rockwell
BY
ATTORNEY

April 4, 1939.  E. A. ROCKWELL  2,153,509
POWER TRANSMITTING APPARATUS AND CONTROL THEREFOR
Filed Feb. 1, 1934  8 Sheets-Sheet 2
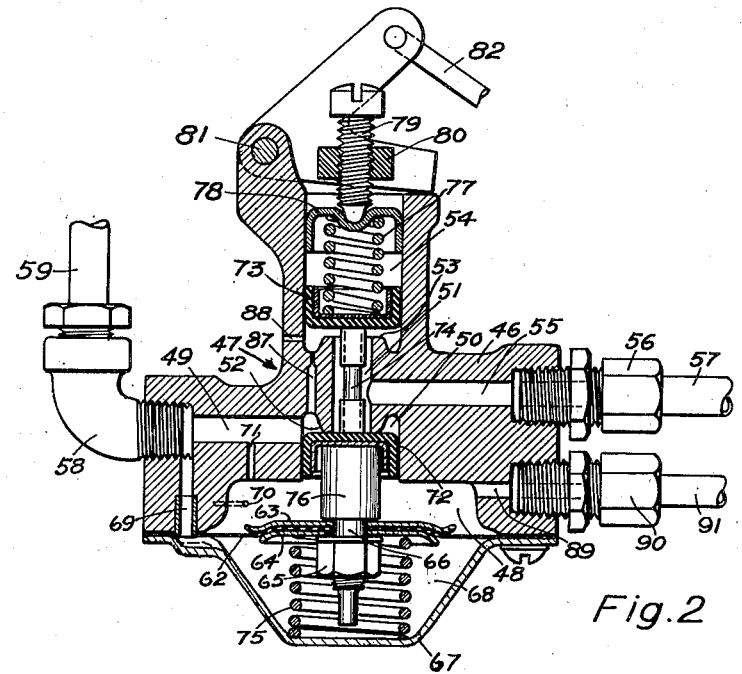
Fig. 2
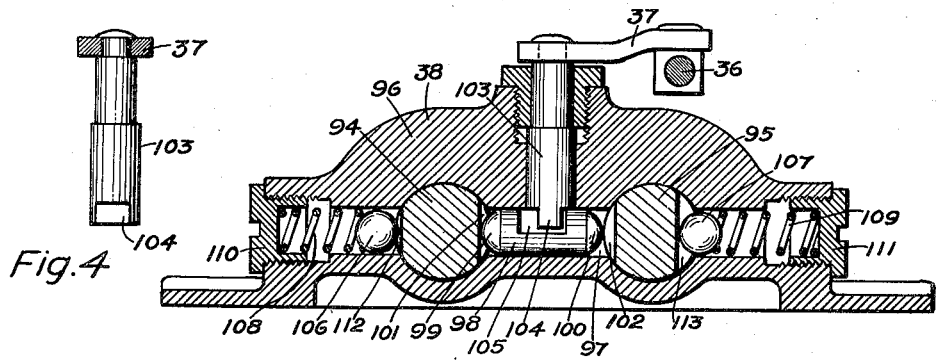
Fig. 4
Fig. 3
INVENTOR
Edward A. Rockwell
BY
ATTORNEY

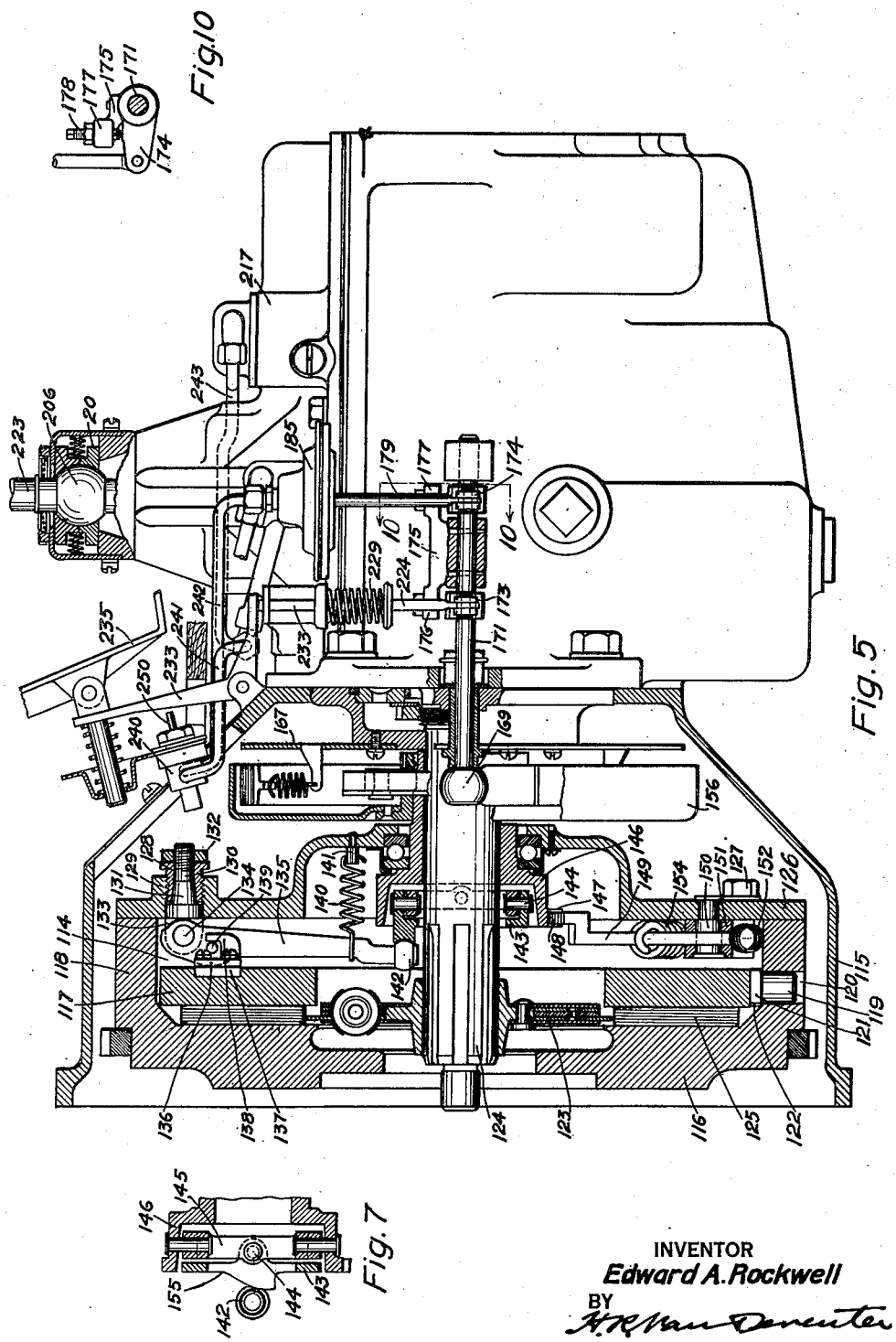

April 4, 1939.  E. A. ROCKWELL  2,153,509
POWER TRANSMITTING APPARATUS AND CONTROL THEREFOR
Filed Feb. 1, 1934  8 Sheets-Sheet 4

INVENTOR
Edward A. Rockwell
BY
ATTORNEY

April 4, 1939. E. A. ROCKWELL 2,153,509
POWER TRANSMITTING APPARATUS AND CONTROL THEREFOR
Filed Feb. 1, 1934 8 Sheets-Sheet 5

INVENTOR
Edward A. Rockwell
BY
ATTORNEY

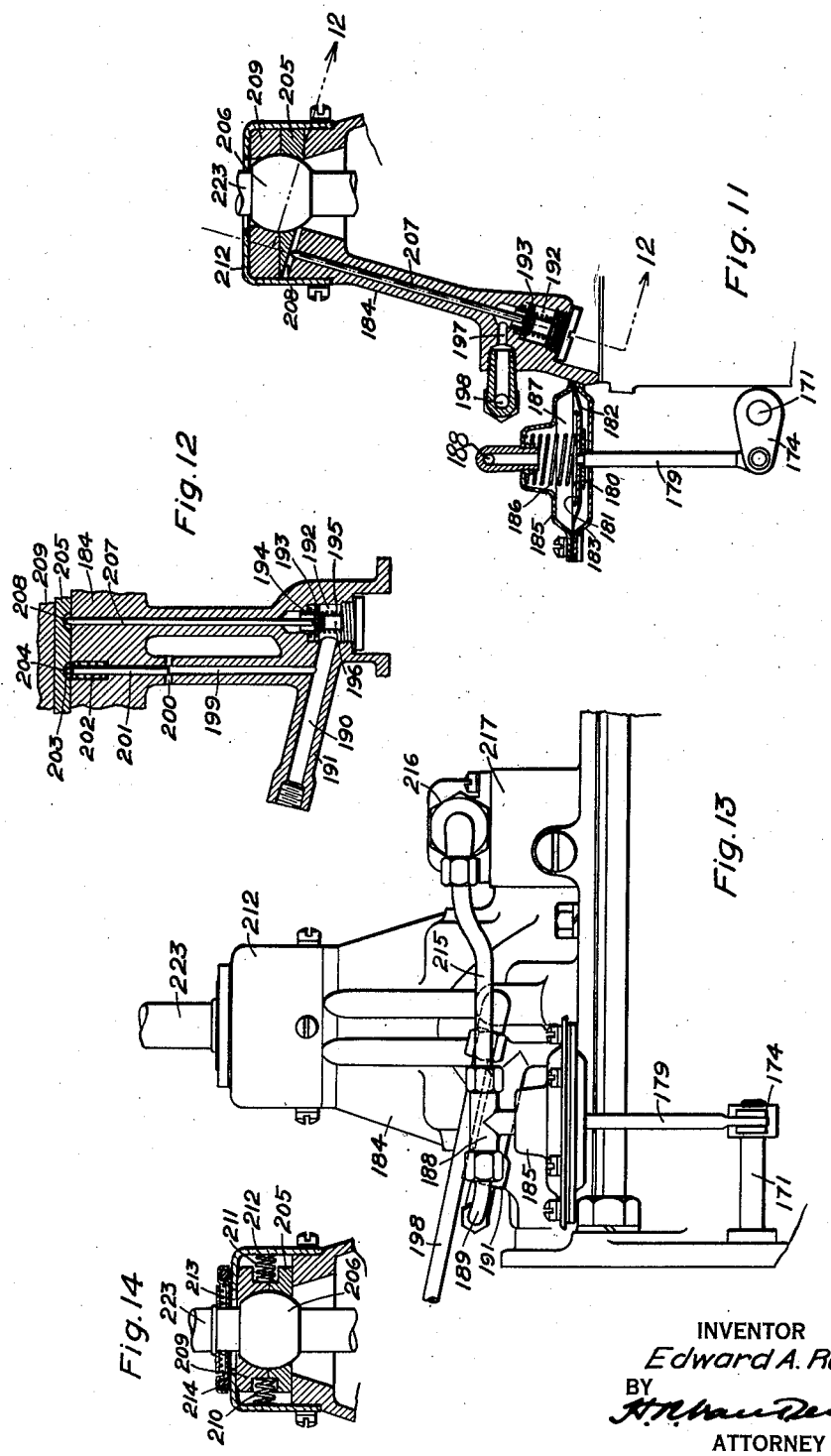

April 4, 1939.　　　　E. A. ROCKWELL　　　　2,153,509
POWER TRANSMITTING APPARATUS AND CONTROL THEREFOR
Filed Feb. 1, 1934　　　　8 Sheets-Sheet 7

INVENTOR
*Edward A. Rockwell*
BY
ATTORNEY

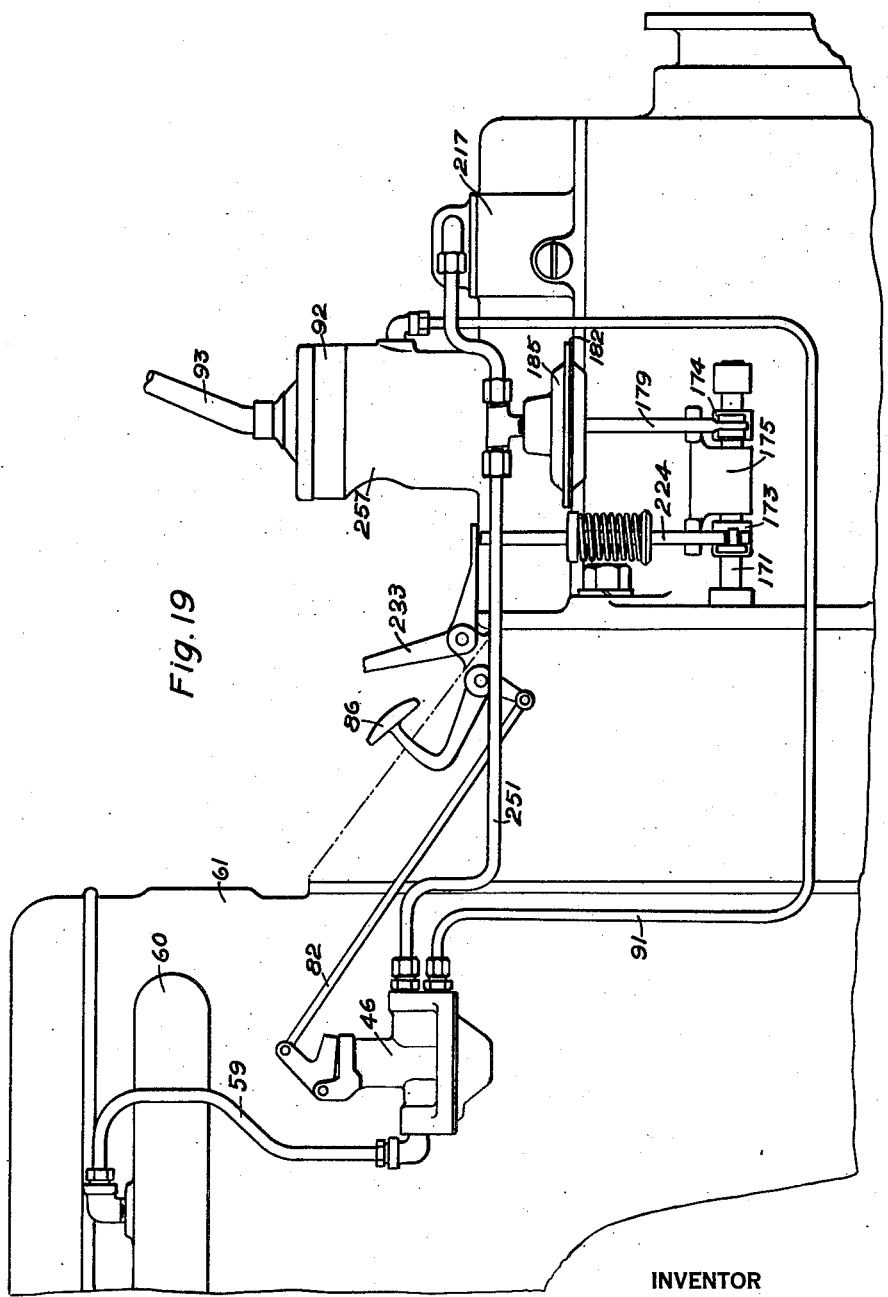

Patented Apr. 4, 1939

2,153,509

UNITED STATES PATENT OFFICE 2,153,509

POWER TRANSMITTING APPARATUS AND CONTROL THEREFOR

Edward A. Rockwell, Chicago, Ill., assignor, by mesne assignments, to General Auto Parts Corporation, a corporation of Delaware Application February 1, 1934, Serial No. 709,318

14 Claims. (Cl. 192—3.5)

This invention relates to a clutch device for use with an automotive vehicle in combination with certain devices for controlling the clutch and related parts.

The invention has for an object the provision of a clutch engaged by speed responsive means and positively disengageable by power means.

Another object of the invention is to provide a combination clutch and freewheeling device for a motor vehicle in which the operation of the clutch may be controlled from a gear shift lever whether the freewheeling device is in operative position or not.

Another object is to provide a combination clutch and servo mechanism where the clutch is thrown out by the servo mechanism which may be mechanically operated, or fluid pressure or manually controlled, or controlled by a combination of means.

A further object is to provide a gear shift interlock for use with any of the foregoing combinations and to provide a clutch in which disengagement is accomplished by power means controlled by fluid means, vacuum, or manual control, and in which engagement is accomplished by centrifugal means.

The invention also contemplates means to eliminate the necessity for a separate free wheel device and also provides manual means for declutching and also automatic means for declutching while shifting gears, and further includes means so that at low engine speeds the engine will not be stalled by the continued application of servo force after the clutch has been released.

The invention consists substantially in the construction, combination, location and relative arrangement of parts, all as will be more fully hereinafter set forth as shown by the accompanying drawings, and finally pointed out in the appended claims.

Fig. 2 is a vertical section of the trip valve shown in Fig. 1.

Fig. 3 is a cross section of the gear shift lock shown in Fig. 1.

Fig. 4 is a side elevation of the lock shaft or spindle shown in Fig. 3.

Fig. 5 is a vertical view in part section of a clutch engaged centrifugally and disengaged by power means controlled either manually or by vacuum.

Fig. 7 is a detail of the cam and roller mechanism of Fig. 5.

Fig. 10 is a detail of the brake actuating mechanism of Fig. 5.

Fig. 11 is a fragmentary cross sectional view of the gear shift tower and vacuum servo of Fig. 5.

Fig. 12 is a fragmentary section on the line 12—12 in Fig. 11.

Fig. 13 is a side elevation of a modified form of gear shift tower and vacuum servo mechanism.

Fig. 14 is a longitudinal section of the gear shift lever mounting of Fig. 13.

Fig. 19 shows a combined manual and vacuum control of the power-released clutch including the trip valve shown in Figs. 1 and 2.

Fig. 20 is an enlarged detail view of the gear shift air valve shown in Figs. 1 and 19.

Figure 1:
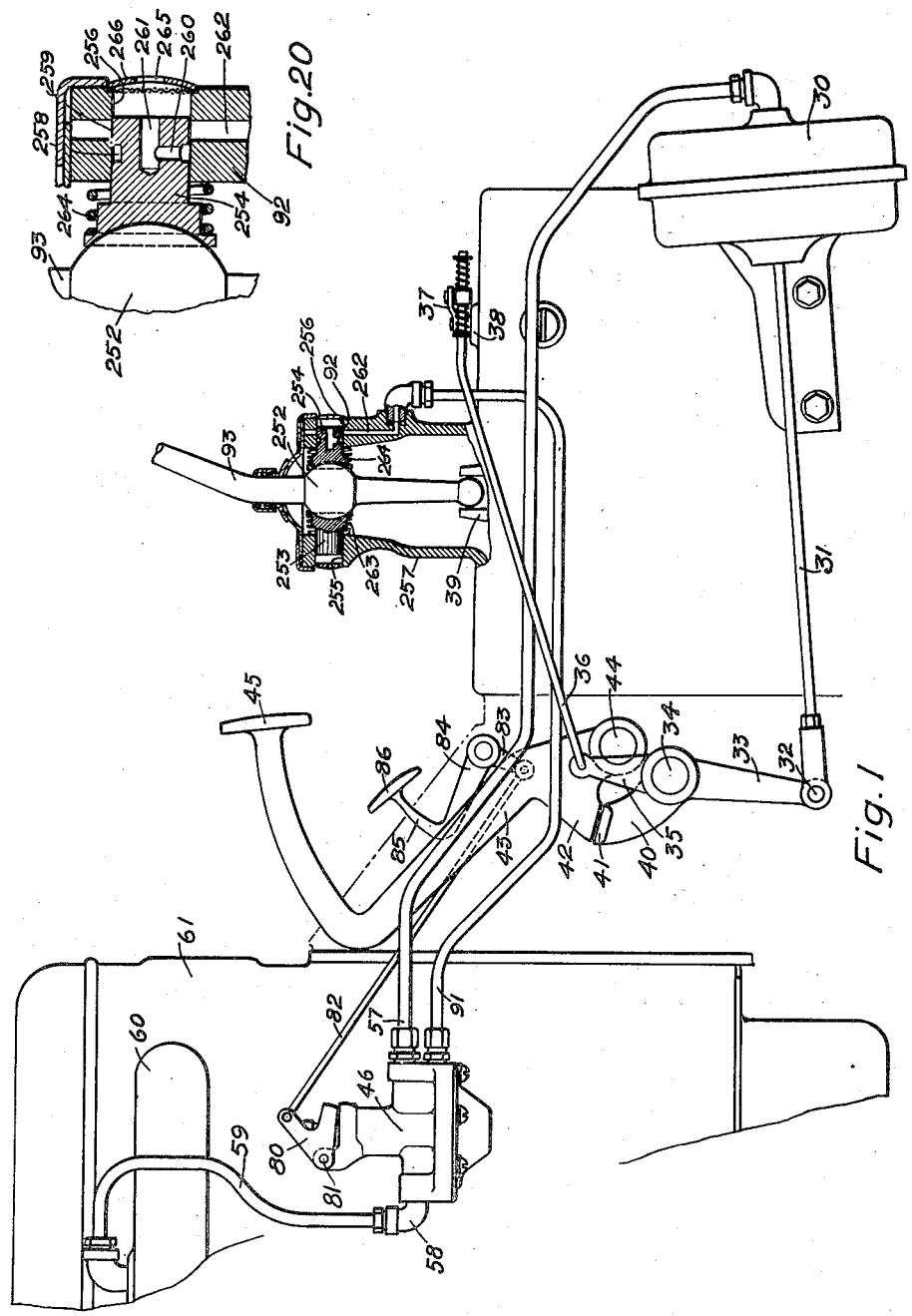
Fig. 1 is a side elevation of a vacuum control operating a standard clutch by means of a vacuum cylinder.

Referring to Fig. 1, the numeral 30 denotes a vacuum motor of a known type adapted to retract a link 31 pivoted at 32 to a lever 33 fastened to a clutch throw-out shaft 34. An extension 35 of lever 33 is connected by a link 36 to a lever 37 for operating the gear shift lock, hereafter described and generally denoted by the numeral 38.

The numeral 39 denotes a shifter fork of the gear shift mechanism. A curved lever 40 fixed on the throw-out shaft 34 has an end shoe 41 adapted to be engaged by an extension 42 of a pedal lever 43 fulcrumed on a pin 44. The pedal lever 43 terminates in the usual foot pedal 45.

The numeral 46 generally denotes the trip valve shown in detail in Fig. 2.

Referring to Fig. 2 the numeral 47 denotes a valve body formed with a lower recess or chamber 48. A lateral passage 49 opens into a central bore 50 above which is a smaller concentric hole 51 having a downwardly directed rim 52 and an upwardly directed rim 53 extending into an upper bore 54.

A second lateral passage 55 opening into the hole 51 is connected through a fitting 56 and a tube 57 with the vacuum motor 30 in Fig. 1. A fitting 58 and a tube 59 connect the lateral passage 49 with the inlet manifold 60 of the engine 61, Fig. 1. A diaphragm 62, Fig. 2 clamped between central plates 63 and 64 by means of a nut 65 on a stem 66 is fastened in sealing relation between the bottom of body 47 and dished cap 67, acting as a lower closure for the recess or chamber 48, and forming with cap 67 a lower closed chamber 68.

A passage 69 connects the lower chamber 68 with the lateral passage 49 and a small orifice 70 connects the chamber 48 with the outer atmosphere. A second orifice 71 larger than 70 leads from the chamber 48 to the lateral passage 49.

A lower piston 72 slidable in sealing relation in the bore 50 and an upper piston 73 slidable in sealing relation in the upper bore 54 are spaced apart by a rod 74 extending through the hole 51 and having a large clearance therein.

Pistons 72 and 73 are adapted to seat against lower and upper rims 52 and 53 respectively, the length of spacer rod 74 being such that when either piston is seated the other is unseated.

A compression spring 75 retained between cap 67 and plate 64 urges the stem 66 upward, and an enlarged portion 76 of stem 66 urges the piston 72, the spacer rod 74 and the piston 73 upward against the pressure of an upper compression spring 77. The spring 77 is retained by a cup 78 slidable in the upper bore 54.

A screw 79 adjustably held in a lever member 80 pivoted at 81, engages the cup 78. The lever member 80 is connected by a link 82 with the lower leg 83 of a bell crank lever 84, Fig. 1, the upper leg 85 thereof carrying a foot pedal 86.

A small orifice 87, Fig. 2, opens from the lateral passage 49 to the bottom of upper bore 54 and an orifice 88 opens from 54 to the atmosphere. A third lateral passage 89 in body 47 opens into the chamber 48 and is connected through a fitting 90 and a tube 91 with a valve 92 controlled by the gear shift lever 93, the valve 92 being normally closed except when manually actuated.

Referring to Fig. 3 which illustrates the shift lock 38, the numerals 94 and 95 denote the usual transmission shifter rods slidable in the body 96. A cross hole 97 contains a slidable lock pin 98 having rounded ends 99 and 100 adapted to engage notches such as 101 and 102 in the rods 94 and 95 respectively.

The length of lock pin 98 is such that it is necessary for one rounded end to be entirely seated in a notch in order for the opposite rounded end to clear the other rod so as to allow the latter to be shifted.

A vertical pin 103 carrying the lever 37 has a bottom extension or cam 104 which engages a rectangular notch 105 in the lock pin 98. The shape of the cam 104 is such that when turned in the direction shown in Fig. 3, it has sufficient clearance in the notch 105 to allow the lock pin 98 to slide to full engagement in the notch of either rod as the other is shifted, thus allowing one rod to be shifted while locking the other. The described position as shown in Fig. 3 is hereafter referred to as "released position."

Referring to Fig. 4 which shows the pin 103 turned 90°, it will be seen that the cam 104 in this view extends the full diameter of pin 103. When, therefore, the lever 37 is operated so as to swing the pin to this position the cam 104 is rotated to a position substantially without clearance in notch 105, thus holding the lock pin 98 in central position, in which position both rounded ends are partially engaged by notches in the shift rods so as to prevent either of the latter from sliding. This position is hereafter referred to as "locked position".

The numerals 106 and 107 denote balls slidable in the outer portions of the cross hole 97 and urged inward by springs 108 and 109 backed by plugs 110 and 111 so as to engage notches such as 112 and 113 in the shifter rods, forming spring latches for normally locating and retaining the rods in various gear shift positions.

In Figs. 5, 6, 7, 8 and 9 is shown a clutch in which disengagement is accomplished by power means adapted to be controlled by vacuum or manually, but in which engagement is accomplished by centrifugal means.

Referring to these figures, the numeral 114 generally denotes a clutch provided with a casing or bell housing 115. The driving members consist of an engine flywheel 116 and a presser plate 117 slidable inside the rim 118 of the said flywheel.

A plurality of studs 119 in radial holes 120 in the rim 118 have squared heads 121 engaging grooves 122 in the presser plate 117, thereby providing a positive driving connection between the flywheel and presser plate.

A driven member or plate 123 of any suitable type splined to a driven shaft 124 is situated between flywheel 116 and presser plate 117.

Friction facings 125 on the driven member 123 are adapted to be engaged by the faces of flywheel 116 and presser plate 117. A rear plate or closure 126 fastened to the flywheel rim 118 by means of cap screws 127 contains a plurality of bushings 128 threaded into bosses 129. Studs 130 having tapered portions 131 fitting in corresponding tapers in bushings 128 are drawn into and tightly retained in the bushings 128 by means of nuts 132.

The forward or left hand ends of studs 130 terminate in forks 133 which support fulcrum pins 134. Radially disposed finger levers 135 are fulcrumed at their outer ends on pins 134.

Cam faces 136 on levers 135 engage the surface of shoes 137 screwed to the presser plate 117. Hooks 138 formed on the shoes 137 engage cross pins 139 in levers 135.

Tension springs 140 rearwardly held by pins 141 in the rear plate 126 normally hold the levers 135 to the right or disengaging position. The inner ends of levers 135 carry rollers 142 adapted to engage a cam ring 143 shown in further detail in Fig. 7. The cam ring 143 is trunnioned at 144 to a second ring 145 which in turn is trunnioned at 90° to a sleeve member 146 rotatably mounted in the rear plate 126. The face of the cam ring 143 has a series of depressed portions 155, Fig. 7.

Figure 6:
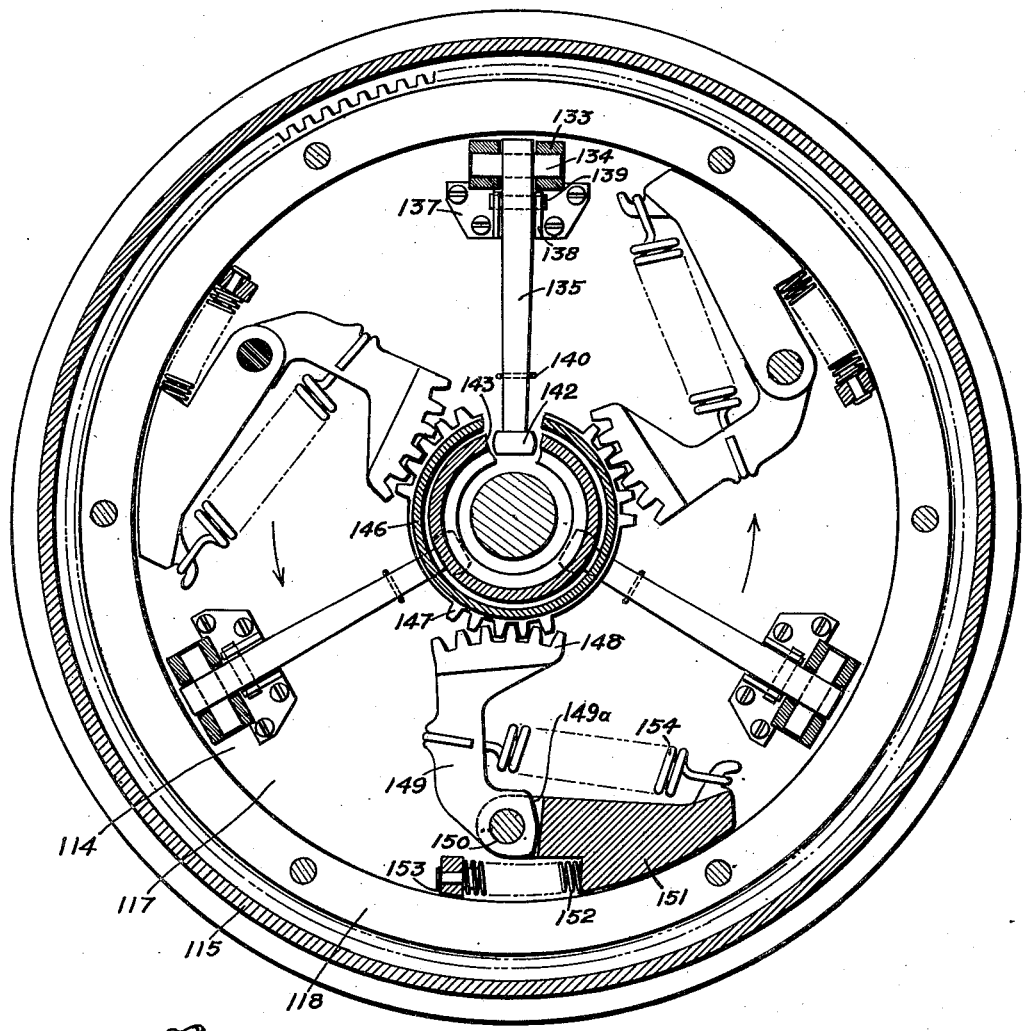
Fig. 6 is a rear view of the clutch mechanism of Fig. 5.

The sleeve member 146 has a series of peripheral gear toothed segments 147 meshing with corresponding segments 148 (Fig. 6) on levers 149 fulcrumed on pins 150 fixed in the rear plate 126. Centrifugal weights 151, normally swung inward by compression springs 152 disposed between them and lugs 153 on the rear plate 126, are also fulcrumed on the pins 150. Heavy tension springs 154 connect the weights 151 and the levers 149 as shown in Fig. 6.

The numeral 149a denotes abutments on levers 149 adapted to be engaged by weights 151 when the latter are swinging inward.

Figure 8:
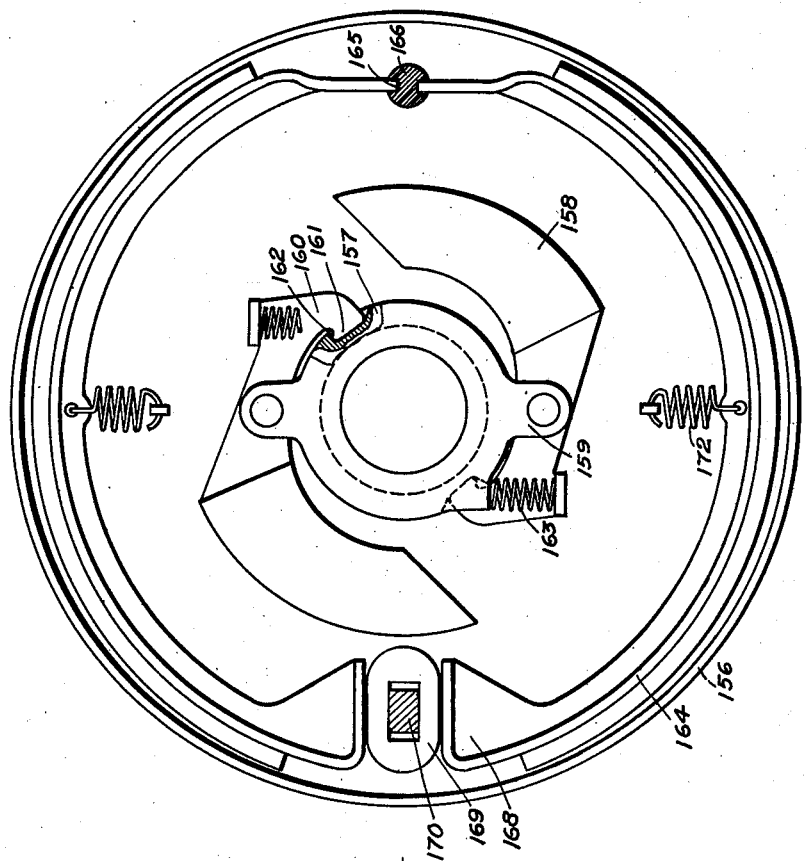
Fig. 8 is a rear view of the power disengaging brake of Fig. 5.
Figure 9:
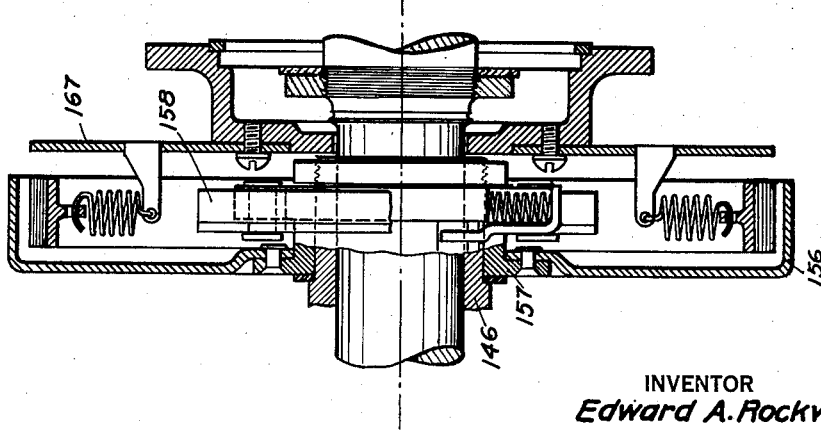
Fig. 9 is a vertical section of Fig. 8.

Referring to Figs. 5, 8 and 9, a brake drum 156 is fastened to a ring 157 rotatably mounted on the sleeve member 146, Fig. 9. A pair of centrifugal weights 158 are pivoted to lugs 159 on the sleeve 146. The short lever ends 160 of weights 158 terminate in hooks 161 adapted to engage notches 162 in ring 157, but normally held clear of them by springs 163.

A pair of brake shoes 164 are supported at one end in notches 165 in a pin 166 fixed to a stationary plate 167. The free ends 168 of shoes 164 are spaced apart by a cam 169 floating on a square end 170 of a brake shaft 171, Fig. 5. Tension springs 172 hold the shoes 164 in engagement with notches 165 and cam 169, and normally hold the shoes out of contact with the drum 156.

A pair of levers 173 and 174, Figs. 5 and 10, are rotatably mounted on the brake shaft 171. A member 175 fixed to shaft 171 has extensions 176 and 177 holding adjusting screws 178 adapted to engage the tops of levers 173 and 174 respectively, so that an upward movement of either lever causes the member 175 to rotate the brake shaft 171.

It will be noted that the above description refers to a structure in which both manual and vacuum control means are provided. Either means may be provided without the other, in which case the member 175 is omitted, lever 173 or 174 being fixed directly to the brake shaft 171 as shown in Figs. 11, 13, 16 and 17, hereafter described.

The vacuum controlling means is shown in detail in Figs. 11, 12, 13 and 14. Referring to the above figures a rod 179 is pivoted as shown in Fig. 11 to lever 174. The rod 179 is fixed at its upper end to rigid plates 180, 181, which are clamped concentrically on the bottom and top of the flexible diaphragm 182. The diaphragm 182 is clamped near its circumference between a vented lower casing member 183 which is rigidly fastened in any suitable manner to the gear shift tower 184, and an upper casing member or cap 185 which retains a compression spring 186 urging the diaphragm 182 downward.

The chamber 187 comprised between cap 185 and diaphragm 182 is connected through a fitting 188 and tube 189 with a passage 190 in a tubular extension member 191 formed on the side of the gear shift tower 184.

The passage 190 terminates in a chamber 192 at the top of which is a downwardly opening disk valve 193 (Figs. 11 and 12) normally urged upward against an annular seat member 194 by a spring 195 disposed between 193 and a guiding plug 196. Above the seat member 194 is a lateral hole 197 which communicates through a tube 198 with the inlet manifold of the motor.

A hole 199 in the tower 194 intersecting a cross hole 200 open to the air, opens into the passage 190. A rod 201 slidable in the hole 199 and adapted to be depressed so as to cover and thereby close cross hole 200 is normally urged upward by a spring 202, the rounded upper end 203 of rod 201 normally projecting into a transverse groove 204 in the lower inclined face of the lower retaining shoe 205 which supports the gear shift lever ball 106. A second slidable rod 207 parallel to 201 and concentric with disk valve 193 rests against the top of the latter and extends into a second transverse groove 208 in the shoe 205.

The lower retaining shoe 205 and the upper retaining shoe 209 are slidable ahead or backward on the top of tower 194 against the force of springs 210 or 211 disposed between the shoes and their retainer cap 212. The retainer cap 212 has an enlarged upper hole allowing operating clearance 213 for the shift lever 223.

A spring pressed seal washer 214 of any desired construction is provided to form a closure for the clearance 213.

Figure 15:
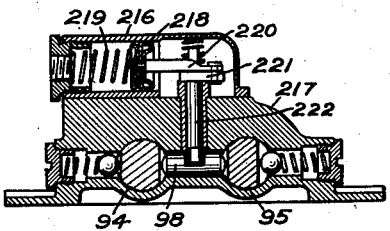
Fig. 15 is a cross section of the vacuum controlled gear shift lock of Figs. 5 and 13.

An alternate form 217 of the shift lock previously described, is shown in Fig. 15. Here a branch tube 215, Fig. 13, leads from the fitting 188 to a cylinder 216. A piston 218 normally pressed to extreme outward position by a spring 219 is connected by rod 220 with the lock lever 221 and vertical cam pin 222. The lower parts of the releasing and locking mechanism are identical with those described in Fig. 3 and are denoted by the same numbers.

Figure 16:
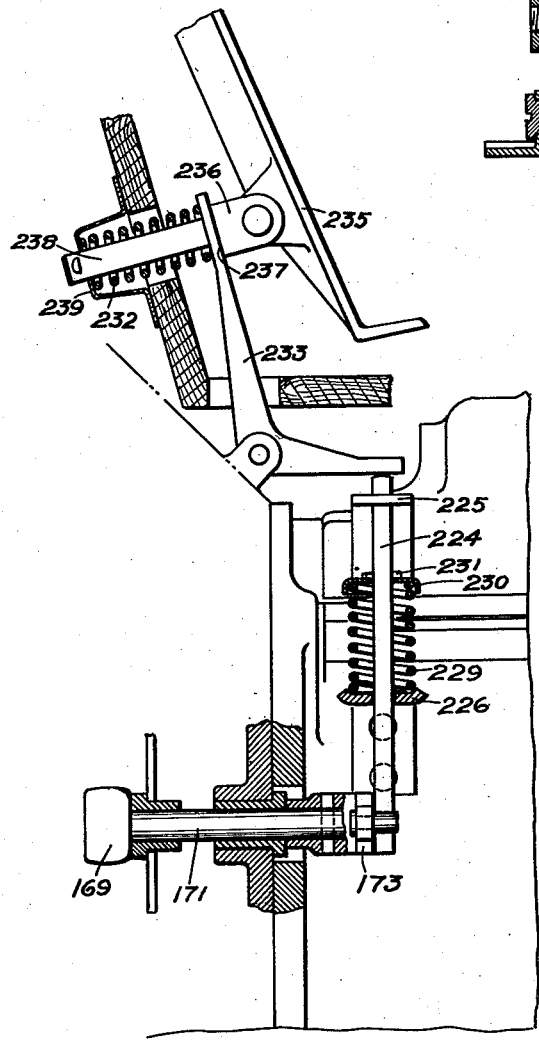
Fig. 16 is a side elevation of manual control means for the power clutch release.
Figure 17:
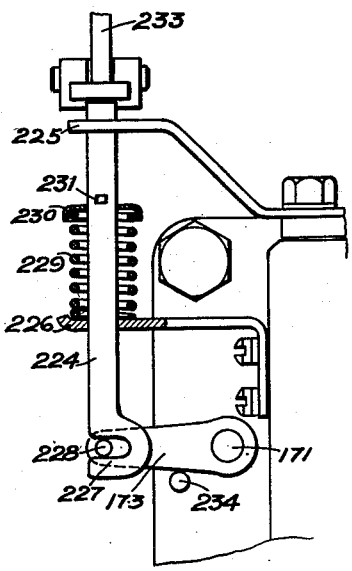
Fig. 17 is a fragmentary rear view of the device shown in Fig. 16.

Figs. 16 and 17 illustrate in detail means by which the clutch disengagement may be controlled manually.

The numeral 224 denotes a vertical member slidable in fixed guides 225 and 226 and having a lower slotted end 227 engaging a pin 228 in lever 173.

A compression spring 229 disposed between lower guide 226 and a cap 230 abutting against cross pin 231 in the vertical member 224 normally urges 224 upward.

A second spring 232 acting on 224 through a bell crank 233 normally overcomes the force of spring 229 thereby holding lever 173 down against a stop 234 in such position that the brake cam 169 Fig. 8, is held as shown.

A foot pedal 235 is pivoted to a fork 236 having a shoulder 237 bearing against the bell crank 233, and also having a cylindrical extension 238 slidable in a fixed guide 239, the cylindrical extension 238 acting as a guide for spring 232 between bell crank 233 and fixed guide 239.

Figure 18:
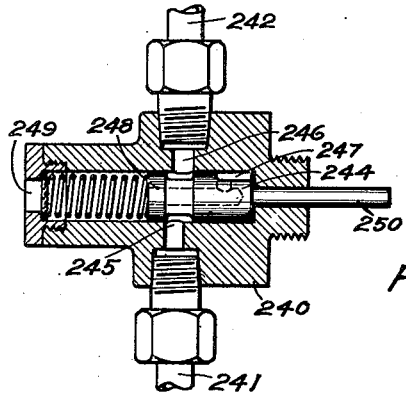
Fig. 18 is a longitudinal section of the vacuum release and cut-out valve shown in Fig. 5.

When the manual control means described is applied in combination with the vacuum means as shown in Fig. 5, a small two-way valve 240, Fig. 18, is placed in the line 241 and 242 between the passage 190 and the diaphragm chamber 187, Fig. 11.

A separate tube 243 leads from passage 190 to the shift lock cylinder 216. The valve 240 has an internal spring pressed plunger 244 which when depressed closes the port 245 and opens port 246 to the air through the groove 247, internal passage 248, and a screened vent hole 249.

The number 250 denotes a stem or extension of plunger 244 adapted to be engaged by the bell crank 233.

In Fig. 19 is shown a combined manual and vacuum control of the clutch brake including a trip valve 46 of the type shown in Figs. 1 and 2.

In this figure in which parts identical with those previously described are denoted by the same numbers, the numeral 251 denotes a tube connecting the trip valve 46 with the vacuum gear shift lock 217. The control of the trip valve is by an atmospheric valve 92 of the type shown in Fig. 1.

Fig. 20 shows an enlarged view of this valve, the parts being denoted as follows in Figs. 1 and 20.

Referring to the above figures, the shift lever 93, carries the usual ball 252 which is supported in spherical depressions in the heads of opposed plungers 253 and 254 which are slidable forward and backward in cylindrical bores 255 and 256 in the tower 257.

Plunger 254 has a groove 258 spaced from its other end, bearing a flange 259. Drilled holes 260 and 261 connect the groove 258 with the space in bore 256 beyond the plunger head. A vertical hole 262 in the tower 257 communicates through tube 91 with the trip valve 46 as described in Figs. 1 and 2. Opposed springs 263 and 264 normally urge the plungers 253 and 254 into central position as shown in Figs. 1 and 20, the flange 259 effectively closing the hole 262.

The numeral 265 denotes a vent hole in the end cap 266.

The operation of the apparatus is as follows:

Referring first to Figs. 1, 2, 3, 4 and 20, which deal with the standard clutch operated by vacuum, with freewheeling provision, and with clutch operation controlled by the gear shift lever whether in freewheeling or not, the engine 61 being in operation, the vacuum in manifold 60 is communicated through tube 59 and fitting 58 to the lateral passage 49 in the trip valve 46 Fig. 2, thence through the passage 69 to the lower chamber 68 below the diaphragm 62. The vacuum is also applied to the chamber 48 above the diaphragm 62, but due to air leakage through the small orifice 70 the pressure in 48 is normally higher than that in 68, thus tending to move the diaphragm 62 downward. This pressure difference is not normally sufficient to compress the spring 75 which therefore holds the piston 72 seated on rim 52.

Should it be desired to freewheel, the pedal 86 is depressed thereby pulling on the link 82, swinging the lever 80 and the screw 79 downward. This causes screw 79 to force the cup 78 downward, loading the spring 77 and causing it to partially equalize the lower spring 75.

If the accelerator of the car is released, thus closing the throttle, the sudden increase in vacuum below the diaphragm 62 together with the loading of spring 77 releases the lower piston 72 from its seat on rim 52. As 72 leaves 52 vacuum from passage 49 is communicated through hole 51 to the inside of bore 54 causing a sudden lowering of pressure below piston 73 which further assists the spring 77, thereby causing the lower piston 72 to drop with a snap or pop action to its lowest position, and the upper piston 73 to seat on rim 53.

A communication is now opened from the inlet manifold 60 to the passage 49, the hole 51, to the lateral passage 55 and the tube 57 to the vacuum motor 30, Fig. 1. The consequent fall in pressure behind the piston in the vacuum motor 30 causes the latter to retract the link 31, swing the lever 33, revolving the shaft 34 and thereby disengaging the clutch. The car now free wheels until the motor throttle is opened thus reducing the vacuum in chamber 68 below the diaphragm 62 and in the upper bore 54 below the piston 73, until the latter is raised from its seat by the action of spring 75. As 73 leaves its seat the pressure in the bore 54 (which pressure is practically atmospheric due to the fact that orifice 88 is much larger than orifice 87) acts suddenly on the bottom of piston 73, causing it to "pop" away from its seat, lower piston 72 meanwhile seating against rim 52 so as to close off hole 51 from the source of vacuum. Air now enters through the orifice 88 allowing the pressure in hole 51, passage 55 and consequently in the vacuum motor 30 to build up, thereby permitting the clutch to re-engage.

It should be noted that while the disengaging of the clutch is accomplished quickly by sudden admission of vacuum by the trip valve action described, the speed of re-engagement is regulated by the size of orifice 88 which throttles the incoming air after the sudden rise of the trip valve. Thus the clutch may be caused to engage as slowly as desired by choosing the size of orifice 88.

From the foregoing it will be noted that in normal operation the pressure in upper chamber 48 is reduced, as it is open to vacuum through orifice 71 while its only source of atmospheric air is through the small orifice 70. This reduced pressure on the top of diaphragm 62 assists the spring 75 in keeping the lower piston 72 seated on rim 52, that is, in keeping the valve closed. When however, the gear shift lever is operated its initial movement opens valve 92, Figs. 1 and 20, to the atmosphere in the following manner:

When the lever 93 is pressed forward the gear shift lock being in locked position, the fork 39, Fig. 1, is held stationary and acts as a fulcrum for the lower end of lever 93. The plunger 253, Fig. 20, is forced forward and the plunger 254 follows, sliding the flange 259 off the mouth of hole 262 and opening the latter to cylinder 256. Air enters through the vent hole 265 in the end cap 266, passes through hole 262 and tube 91 to the upper chamber 48 of the trip valve 46, Fig. 2.

The resulting sudden pressure rise above the diaphragm 62 combined with the vacuum already existing below it and the initial urge of upper spring 77 overcomes the spring 75 and unseats the piston 72, admitting vacuum through the tube 57 to the vacuum motor 30 and disengaging the clutch as previously described. As the clutch disengages the shift lock 38 is released by means of the link 36 which operates the lever 37, permitting gears to be shifted. It is obvious that the lock 38 prevents shifting at any time unless the clutch is released. When manual pressure is released from the lever 93, the ball 252 once more is moved to central position by the spring 263 allowing flange 259 to close the hole 262, shutting off the air "dump" to the trip valve.

A backward shifting movement of the lever 93 causes the groove 258 to register with hole 262. Air from the vent 265 passes inward through 261 and 260 and the groove 258 to the hole 262, tripping the valve as previously described.

The parts of the trip valve 46 are so proportioned that the rise in pressure just described in chamber 48 is sufficient to cause the valve to open whether or not the spring 77 is loaded by operation of the freewheeling pedal 86. Thus the gears may be shifted by moving the shift lever 93 whether the car is freewheeling or not. Should it be desired to release the clutch manually, the clutch pedal 45 is depressed in the usual way, the extension 42 of pedal lever 43 depressing the shoe 41, revolving cross shaft 34 and thereby disengaging the clutch at the same time the shift lock 38 is released, as previously described.

The operation of the power clutch shown in Figs. 5, 6, 7, 8 and 9 is as follows:

When the engine is stopped or idling, the weights 151 are swung inward against the lever abutments 149a by the heavy tension springs 154, and the weight and lever assemblies are swung counter-clockwise (Fig. 6) by the compression springs 152, thereby revolving the cam member 143 and allowing the rollers 142 to be drawn into the depressed portions 155 (Fig. 7) by the tension springs 140 (Fig. 5).

The cross pins 139, engaging the hooks 138, hold the presser plate 117 clear of the friction facings 125, thus keeping the clutch disengaged.

As the engine is speeded up the weights 151 (Fig. 6) swing outward on pins 150 due to centrifugal force, carrying with them as units the levers 149 which are held engaged with weights

151 at abutment 149a by the heavy tension springs 154. This causes the segments 148, Fig. 6, to actuate the segments 147, revolving the cam member 143 anti-clockwise in the direction of the arrows in Fig. 6 or in a forward direction relative to the rollers 142, which latter are thereby forced to the left, Figs. 5 and 7, thereby swinging the levers 135 to the left, Fig. 5. The camming surface 136 bearing on the shoe 137, forces the presser plate 117 to the left. The friction facings 125 of the driven member 123 are pressed between the presser plate 117 and the flywheel 116, causing the clutch to pick up the drive.

After the clutch has engaged, the weights 151 continue to swing outward, leaving the abutments 149a and stretching the springs 154. Having placed the maximum desired pressure on the friction surfaces, the weights 151 come into contact with the flywheel rim 118 which restrains them from further movement, thereby preventing injury to the friction surfaces by undue pressure increase at high speeds, and facilitating declutching as will be explained hereafter.

The purpose of the double trunnion connection of cam member 143 with the sleeve member 146 is to permit the cam member to float so as to exert equal pressures on all rollers 142.

When the engine slows down, the weights 151 swing inward against abutments 149a under the forces of the compression springs 152 acting directly on them and tension of springs 154. At the same time the tension springs 140, Fig. 5, tend to pull the rollers 142 into the depressed portions 155 of cam member 143 and thereby revolving the cam member 143 in a clockwise or backward direction. When the centrifugal force of weights 151 has been sufficiently reduced the compression springs 152 force the weights and levers 149 counter-clockwise, the segments 148 allowing the sleeve member 146 and the cam member 143 to revolve. The rollers 142 ride into the depressed portions 155, the springs 140, Fig. 5, swinging the levers 135 to the right and disengaging the clutch.

The foregoing fully automatic disengagement, for proper functioning would require the use of an overrunning clutch or freewheel to permit the necessary slowing of the engine under certain circumstances without slowing down the entire vehicle. To eliminate the necessity for a separate freewheel, and also to provide manual means for declutching as well as automatic means for declutching while shifting gears, any desired braking device of which that shown in detail in Figs. 5, 8 and 9, is typical, may be employed.

It will be noted from the foregoing description that the relative rotation of the sleeve member 146 necessary for declutching is in a clockwise direction, Fig. 6, that is in the reverse direction relative to the rotation of the engine as shown by the arrows of Fig. 6. If, therefore, a braking force is applied to the sleeve member 146 sufficient to overcome the tension of springs 154, declutching will result.

When the engine and consequently the sleeve 146 are at rest or running very slowly, the hooks 161, Fig. 8, are held clear of the notches 162 by the springs 163. When the engine comes up to normal idling speed the weights 158 swing out by centrifugal force, causing hooks 161 to engage notches 162, thereby driving the drum ring 157 and the drum 156.

The object in causing the hooks 161 to release the drum 156 at low engine speeds is to prevent stalling the engine by continued application of the braking force after the clutch has been released and the engine speed comes down to idling.

Assuming the motor to be driving the car, the hooks 161 are engaged and the drum revolving with the sleeve member 146. If either the lever 173 or 174, Fig. 5, on brake shaft 171, is raised, the cam 169 separates the shoes 168, Fig. 8, pressing them against the inside of drum 156 and tending to retard its motion. The drag thus produced is transmitted through the hooks 161 and lugs 159 to the sleeve 146 which is thereby retarded, stretching the tension springs 154, Fig. 6 and rotating the cam 143 clockwise relative to the rollers 142, allowing the levers 135 to disengage the clutch.

It should be noted that the stopping of weights 151, Fig. 6, against the flywheel rim 118 limits the maximum tension of springs 154 and thereby limits the braking force necessary to declutch no matter how great the engine or car speed may be.

The engine having slowed down to idling, the weights 151 release, and the clutch remains disengaged as the braking force is removed from the lever 173 or 174. When the engine is again speeded up, the weights 151 cause automatic reengagement as previously described.

Operation of the clutch brake and the gear shift lock by vacuum takes place as follows, referring to Figs. 11, 12, 13, 14 and 15:—

When the rods 201 and 207 Fig. 12, are in the position shown, the cross hole 200 is open, thereby admitting air at atmospheric pressure through the hole 199 to the passage 190, thence to the diaphragm chamber 187 Fig. 11, and the cylinder 216, Fig. 15. Under these conditions the diaphragm 182 is held depressed by the spring 186, thereby holding 174 in downward position, in which position the brake shoes 164, Fig. 8, are not forced into engagement with the drum by cam 169. Similarly the piston 218 Fig. 15, is held forward by the spring 219, holding the lever 221 forward and locking the gear shift as previously described.

When it is desired to shift gears, for instance from high to second gear, requiring a forward motion of the lever 223, the initial pressure applied to the lever cannot shift the gears due to the lock 217, which resists movement of the lower end of the lever. The lower end of the lever becomes the fulcrum point, and the ball 206 forces the shoes 205 and 209 forward, that is to the left Figs. 12 and 14, against spring 210 Fig. 14. As the shoe 205 slides to the left, Fig. 12, over the top of the tower 184, the edges of grooves 204 and 208 force the rods 201 and 207 downward, closing the cross hole 200 and opening the valve 193, by which means air is shut off from passage 190 and vacuum from the inlet manifold is admitted thereto through the tube 198 Figs. 11 and 13.

The pressure in chamber 187 Fig. 11 is lowered, and the atmospheric pressure below diaphragm 182 forces the latter upward. The rod 179 is drawn upward, raising the lever 174, revolving brake shaft 171 and applying the brake. The resulting braking action disengages the clutch as already described.

Meanwhile the pressure in cylinder 216, Fig. 15, is reduced until atmospheric pressure on the forward end of piston 218 overcomes the spring 219, forcing the piston back, swinging the lever 221, and placing the lock in released position. The gears may now be shifted in the usual manner.

As soon as normal pressure is removed from the lever 223 the spring 210 Fig. 14, forces the shoes 205 and 206 back to central position Figs. 12 and 14. The rods 201 and 207 rise into grooves 204 and 208, allowing the vacuum valve 193 to close and admitting air through the cross hole 200, thus returning the diaphragm 182 to normal position and releasing the brake. As the brake releases the clutch reengages by action of tension springs 154 Fig. 6, unless the motor has dropped to idling speed, in which case upon speeding up the reengagement takes place centrifugally as previously described. Meanwhile the pressure in cylinder 216 Fig. 15, has risen to atmospheric allowing the spring 219 to return the lock to locked position.

Due to the difference in areas of diaphragm 182, Fig. 11, and piston 218, Fig. 15, and the proportioning of their springs, the diaphragm applies the brake and releases the clutch before sufficient vacuum has occurred in cylinder 216 to unlock the gearshift, thereby preventing a shift before declutching.

It should be noted that an initial movement of lever 223 either forward or backward forces the rods 201 and 207 out of grooves 204 and 208, Fig. 12, so that the mechanism functions as described during any shifting of the gear positions.

Referring to Figs. 16 and 17, which illustrate a manually actuated device for control of the clutch brake, the operation is as follows:—

When the pedal 235 Fig. 16, is depressed, the spring 232 is depressed, and the bell crank 233 no longer restrains vertical member 224, which is forced upward by spring 229. This raises lever 173 revolving brake shaft 171 and releasing the clutch as previously described. As pressure is released from the pedal 235 the spring 232 again overcomes the spring 229, returning the parts to normal position and allowing reengagement of the clutch.

When both manual and vacuum means are provided for controlling the clutch brake, as shown in Fig. 5, the two-way valve 240 is so placed that the bell crank 233 when actuated by the pedal 235 depresses the stem 250, thereby disconnecting the chamber 187 Fig. 11, from the passage 190 Fig. 12, and admitting air to the chamber 187 through tube 242, Fig. 5. By this provision, atmospheric pressure is assured above the diaphragm 182 whenever the manual means is applying the clutch brake, thereby preventing both braking means from being actuated at the same time. Due to the separate tube 243, Fig. 5, which leads from the passage 190 Fig. 12, to the shift lock 217, the operation of the latter is not affected by the valve 240, and gears may be shifted at any time, whether the pedal 235 is depressed or not.

In Fig. 19 the combined manual and vacuum clutch brake means as described are shown with a trip valve 46 of the type shown in Figs. 1 and 2 controlling the action of the diaphragm 182 and gearshift lock 217. With this combination automatic freewheeling is secured in the manner described in connection with Figs. 1 and 2, except that the clutch is released by vacuum-controlled power instead of directly by a vacuum motor such as 30, Fig. 1. Manual control is permitted in the manner already described.

The vacuum gear-shift lock 217 and the operation of diaphragm 182 are controlled by the trip valve 46 through 251. The tripping of the valve when shifting gears is accomplished as described under Figs. 1 and 20 by an atmospheric valve 92 on the gear shift tower 257.

What is claimed is:

1. In combination, a clutch, servo means operable to disengage said clutch, means actuated by a difference of two fluid pressures each differing from the atmosphere operable to control said first means, and spring means adapted to determine said fluid pressure difference.

2. In combination, a clutch, servo means operable to disengage said clutch, means actuated by a difference of two fluid pressures each differing from the atmosphere for controlling said first means, spring means adapted to determine said fluid pressure difference, and manually operable means for varying the action of said spring means.

3. In combination, a clutch, servo means operable to disengage said clutch, means actuated by a difference of two fluid pressures each differing from the atmosphere for controlling said first means, spring means adapted to determine said fluid pressure difference, manually operable means for varying the action of said spring means, and manually controllable fluid controlling means for establishing said fluid pressure difference.

4. In combination, a clutch, a transmission, a manually operable lever attached to said transmission, a speed changing device engaging the end of said lever, a clutch control device operable by fluid pressure operatively connected to the middle portion of said lever, and means adapted to convert said lever from a lever of the second class to a lever of the first class, said means comprising an interlocking locking mechanism associated with said speed changing device.

5. In combination, a clutch, a transmission, a manually operable lever attached to said transmission, a speed changing device engaging the end of said lever, a clutch control device operable by fluid pressure operatively connected to the middle portion of said lever, and means adapted to convert said lever from a lever of the second class to a lever of the first class, said means comprising an interlocking locking mechanism associated with said speed changing device and operable in conjunction with said clutch control device.

6. In combination, a driving means, a clutch comprising driving and driven members, centrifugal means to cause engagement of said members, power means energized by the driving means associated with said driving member and adapted to disengage said members, and manually operable means to apply said power means.

7. In combination, a driving means, a clutch comprising driving and driven members, centrifugal means to cause engagement of said members, power means energized by the driving means associated with said driving member and adapted to disengage said members, and means operable by vacuum to apply said power means.

8. In combination, a clutch comprising driving and driven members, centrifugal means to cause engagement of said members, power means associated with said driving member and adapted to disengage said members, manually operable means to apply said power means, means operable by fluid pressure to apply said power means, and means adapted to prevent application of said power means by both manual and fluid pressure means at the same time.

9. In combination, a clutch comprising driving and driven members, a change speed transmission associated with said clutch, a shift lever attached to said transmission, centrifugal means to cause engagement of said driving and driven members, power means adapted to disengage said members, manually operable means to apply said power means, means operable by fluid pressure to apply said power means, means operatively connected to said gear shift lever to control said fluid pressure, and a shift lock operable in conjunction with said power means.

10. In combination, a clutch comprising driving and driven members, a change speed transmission associated with said clutch, a shift lever attached to said transmission, centrifugal means to cause engagement of said driving and driven members, power means adapted to disengage said members, manually operable means to apply said power means, servo means to apply said power means, means operatively connected to said gear shift lever to control said servo means, a shift lock operable in conjunction with said power means, and means to permit said driven member to overrun said driving member.

11. In combination, a clutch comprising driving and driven members, a housing for said clutch, centrifugal means to cause engagement of said members, and power means adapted to disengage said members, said power means including a braking member attached to said housing and a cooperative braking member rotatively driven by said driving member when said driving member is revolving above a predetermined speed, and speed responsive means to release said second braking member from said driving member below said predetermined speed.

12. In combination with a clutch and a vacuum control device therefor, a trip device adapted to admit vacuum to said control device, said trip device including a valve and a seat therefor, spring means normally seating said valve, vacuum actuated means adapted to unseat said valve to allow an initial flow of vacuum to said control device, and means operable by said initial flow to augment said vacuum actuated means whereby the further opening of said valve is accelerated.

13. In a trip valve operable by a difference of fluid pressure and adapted to control an automotive device, in combination, means to effect quick shift of said valve to one position whereby one function of said automotive device is caused to be performed suddenly, and to effect quick shift of said valve to another position whereby a second function of said device is caused to be performed, and means to retard the performance of said second function.

14. A clutch having a driving member and a driven member, a friction control means for bringing the clutch into disengagement by said friction and a device for releasing the clutch by means of its rotation below a given speed.

EDWARD A. ROCKWELL.